Feb. 2, 1971 HISASHI KANEKO 3,560,856

MULTILEVEL SIGNAL TRANSMISSION SYSTEM

Filed Dec. 26, 1967 2 Sheets-Sheet 1

INVENTOR
HISASHI KANEKO
BY
Hopgood & Calimafde
ATTORNEYS

Feb. 2, 1971 HISASHI KANEKO 3,560,856

MULTILEVEL SIGNAL TRANSMISSION SYSTEM

Filed Dec. 26, 1967 2 Sheets-Sheet 2

INVENTOR
HISASHI KANEKO
BY
Hopgood & Calimafde
ATTORNEYS

United States Patent Office 3,560,856
Patented Feb. 2, 1971

3,560,856
MULTILEVEL SIGNAL TRANSMISSION SYSTEM

Hisashi Kaneko, Tokyo, Japan, assignor to Nippon Electric Company Limited, Tokyo, Japan, a corporation of Japan

Filed Dec. 26, 1967, Ser. No. 693,499
Claims priority, application Japan, Dec. 29, 1966, 42/964
Int. Cl. H03k *7/00*
U.S. Cl. 325—38 5 Claims

ABSTRACT OF THE DISCLOSURE

A system for transmitting a multilevel signal representative of a binary signal input including a converter for changing the input to a quaternary output code, pulse generator means for the respective quaternary code elements which feed their outputs to a signal synthesizer, and a switching pulse generator connected between the output of the signal synthesizer and the inputs of the pulse generators.

BACKGROUND OF THE INVENTION

As those knowledgeable in the art are aware, a transmission line which employs repeaters is not capable of transmitting a direct current component of a signal, due to the existence of the transformers in each of the repeaters, and therefore considerable difficulty is encountered when a digital signal is to be transmitted. Particularly when a random binary code signal is to be transmitted, the error rate increases due to the fluctuation of the direct current level. To solve this problem, a system has been proposed, as is well known, in which the direct current component is eliminated by transmitting a code "1," for example, as a pseudo-three-valued pulse train (+1, −1, or 0) switched alternately. Also, various coding methods are known in which the direct current components are eliminated by the combination of two or three digits; the details of such methods are described and disclosed in certain papers including the Proceedings of the 1966 Joint General Meetings of the Four Institutes of Electrical Engineers of Japan, No. 1670, and also in The Proceedings of the 1966 General Meetings of The Institute of Electrical-Communication Engineers of Japan, No. 1021.

However, the above-mentioned devices have the disadvantage that the circutis for converting the binary code at the transmitter into the pulse train to be transmitted, or for reproducing from the received pulse train the original binary code, necessarily become complex. Furthermore, no means has been found to overcome this disadvantage.

OBJECTS OF THE INVENTION

It is an object of the present invention to provide a simplified code converting for converting a digital signal into a multilevel signal for eliminating the direct current component.

Another object of the invention is to provide a code converter in which the quality of code signal transmission is improved.

An important feature of the invention is that it is possible with relatively simple structure for the code converter to produce a multilevel signal wherein the direct current component is eliminated.

All of the objects, features and advantages of this invention and the manner of attaining them will become more apparent and the invention itself will be best understood by reference to the following description of the invention taken in conjunction with the accompanying drawing.

SUMMARY OF THE INVENTION

Briefly, according to this invention there is provided a multilevel signal transmission system for receiving a binary input signal and transmitting the information after sutiable conversion. This system includes a code converter for receiving the binary input, converting the same to a quaternary code, pulse generator means for receiving the different quaternary code element signals from the code converter and a signal sythesizer for receiving the output of the pulse generators, the output of the signal synthesizers then being fed to an output terminal for transmission along a suitable transmission line. The system also includes a switching pulse generator or inverter which receives an input from the signal synthesizer and has its output connected to different pulse generators for the respective quaternary code elements. In one embodiment of the invention the switching pulse generator may comprise an integrating circuit followed by a polarity discriminator; in another embodiment the switching pulse generator may comprise a reversible counter followed by a polarity discriminator. By means of this invention, there is provided a simplified transmission system for converting a binary signal into a multilevel signal to be transmitted and whereby the direct current component thereof is eliminated.

DESCRIPTION OF PREFERRED EMBODIMENTS

Figure 1:
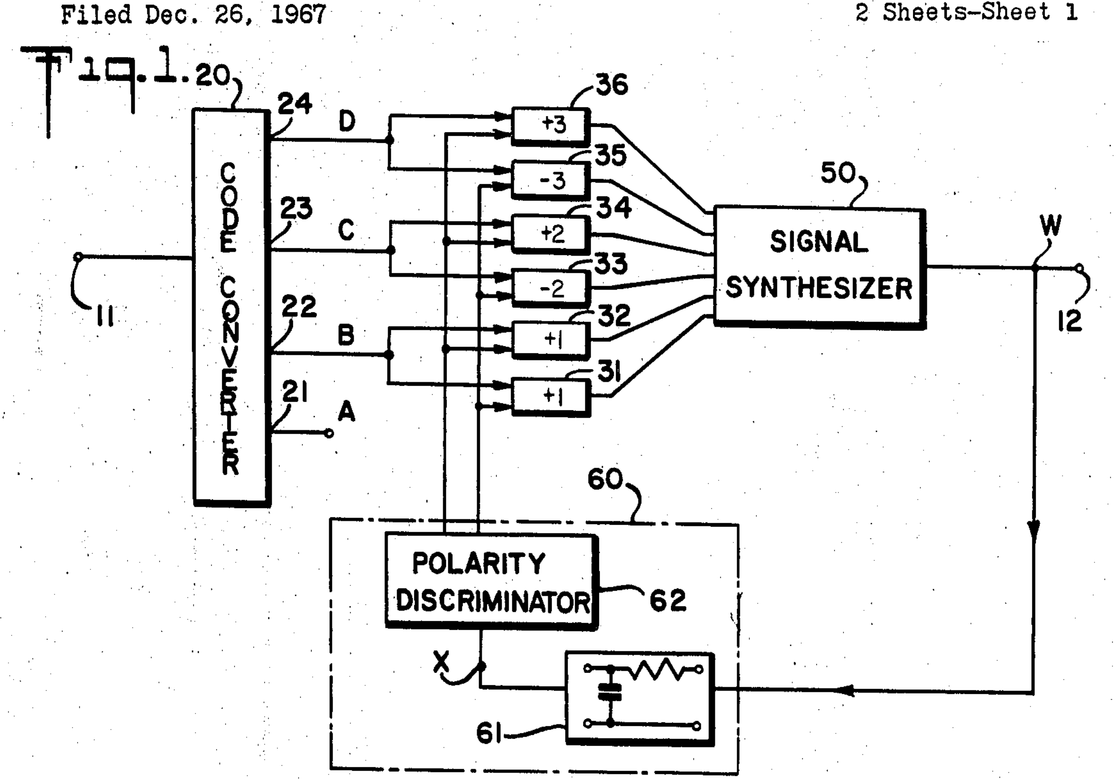
FIGS. 1 and 2 are block diagrams each showing a different embodiment of the invention.

In the embodiment of FIG. 1, it is assumed that a binary code signal is transmitted in the form of a seven-valued multilevel signal. In the transmitter equipment shown therein, a binary signal input supplied to an input terminal 11 is converted by a code converter 20 into a quaternary code represented by the code elements A, B, C and D. An example of the relation between the input binary code and output quaternary codes is indicated in Table 1.

TABLE 1

| Input binary code | Quaternary code | Level of pulse transmitted |
|---|---|---|
| 1 1 | A | 0. |
| 1 0 | B | +1 or −1. |
| 0 1 | C | +2 or −2. |
| 0 0 | D | +3 or −3. |

Since such conversion is realized in well-known manner by a combination of a delay circuit and a logic circuit (AND or OR circuit), and since any suitable type of conversion circuit may be used in this embodiment, a detailed description will be omitted as to the code converter 20.

In this embodiment, the codes A, B, C and D are transmitted in the form of various pulse levels "0," "+1" or "−1," "+2" or "−2," and "+3" or "−3," of the multilevel signal, respectively. The reference numerals 31 to 36 designate pulse generators for generating the above-mentioned pulses of various levels. Each of these generators may comprise a voltage source and a logic circuit The outputs of the generators are transmitted to a transmission line from an output terminal 12 after passing through a signal synthesizer 50, which may comprise a known multi-input transformer or a summing circuit and the like. Also, a blocking oscillator and the like may be used as each of the pulse generators 31 to 36.

The pulse generators 31–36 are supplied with one of the quaternary codes B, C and D from the code converter 20, and also with a switching pulse from a switching pulse generator 60, which comprises an integrating circuit 61 and a polarity discriminator 62 having, for instance, a flip-flop circuit. The switching pulse generator 60 is controlled by the output appearing at the output terminal 12 in such a manner that one of the pulse generators 31, 33 and 35 will generate a pulse of negative polarity when the output from the output terminal 12 integrated by the integrator 61 is positive, and that one of the outputs of the pulse generators 32, 34 and 36 will generate a pulse of positive polarity when the integrated output is negative.

Figure 3:
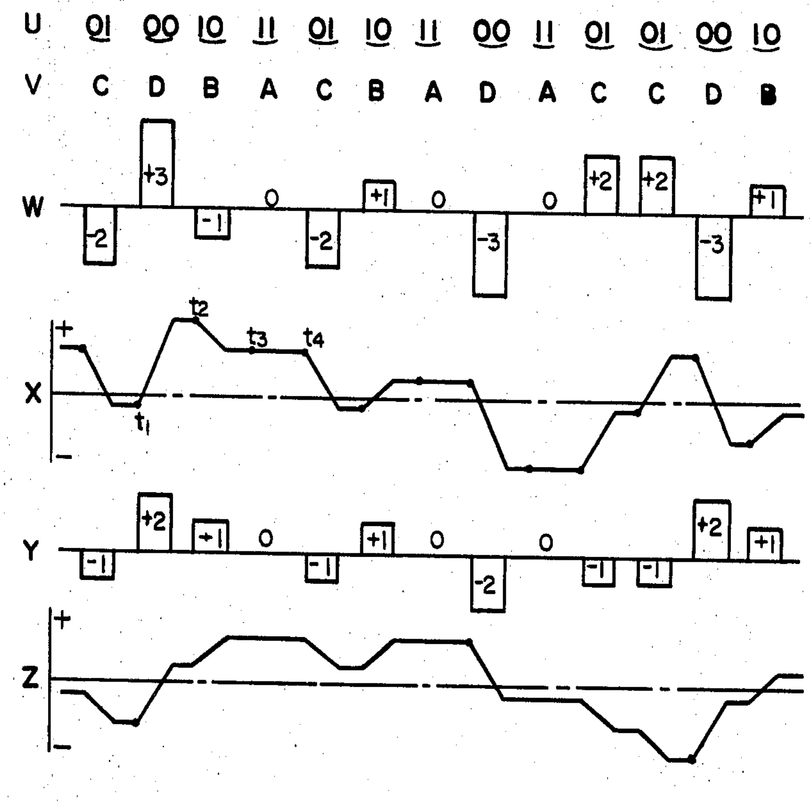
FIG. 3 shows a group of waveforms which illustrate the manner of operation of the embodiments shown in FIGS. 1 and 2.

Further describing the switching pulse generator 60 with reference to FIG. 3, at the time point $t_1$, a pulse of level "+3" is generated, because the integrated value X is negative and the quaternary code is D. At the next time point $t_2$, a pulse of "−1" is generated, because the integrated value X of the preceding pulse of level amplitude "+3" shows positive and because the quaternary code is B. Thus, an output pulse train W is produced as shown in FIG. 3.

As will be understood from the above-mentioned control of the output pulse polarity, the integrated value X is minimized, because this control is a kind of negative feedback control performed through the pulse generator 60. Since the integrated value of the output pulse is itself the direct current component of the digital signal to be transmitted, it will be appreciated that the present invention provides a multilevel signal transmission system which does not transmit the direct current component and in which intercode interaction is not a problem.

In the embodiment shown in FIG. 1, perfect elimination of the direct current component is realized by using pulses of positive and negative polarities and 7 levels in all corresponding to each of the quaternary codes B, C and D. Generally, $2m-1$ levels of output pulse signal are necessary for transmission of each digit of m-ary code. As the number $m$ increases, the number of pulse generators should be increased accordingly at each of the repeaters, and the signal-to-noise characteristics are degraded. For this reason, it is desired to make the number of levels as small as possible.

Figure 2:
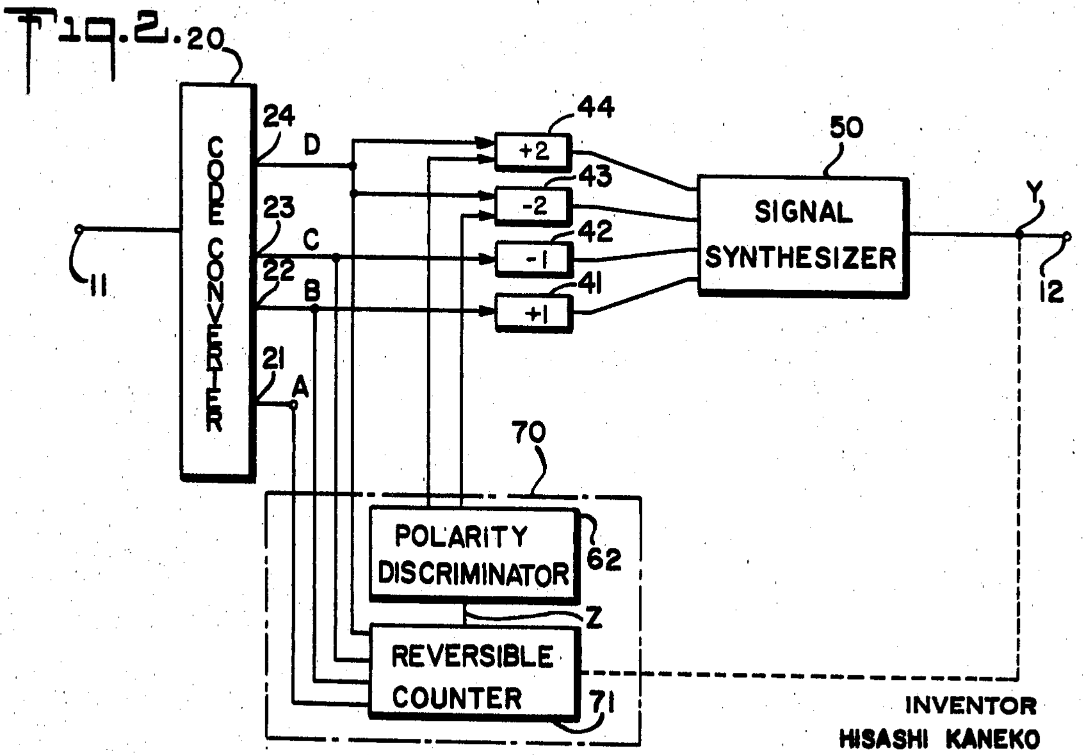

An example of the output level decrease from this point of view will become apparent from Table 2 taken in conjunction with the embodiment of FIG. 2.

TABLE 2

| Input binary code | Quaternary code | Level of pulse transmitted |
|---|---|---|
| 1 1 | A | 0. |
| 1 0 | B | +1. |
| 0 1 | C | −1. |
| 0 0 | D | +2 or −2. |

As will be obvious from Table 2, the quaternary codes A, B and C correspond to the amplitude levels "0," "+1" and "−1,", respectively, while the code D corresponds to the amplitude level +2 or −2. As shown in FIG. 2, polarity inversion is performed by an inverter 70 only when the code D occurs. More particularly, the integrated value Z of the output Y, see also FIG. 3, causes the polarity discriminator to select a level +2 or −2 so that the direct current component of the output may be minimized. As a result, a multilevel pulse train Y having a direct current component of almost zero is obtained.

The inverter 70 in FIG. 2 may be similar to the pulse generator 60 in FIG. 1, in which the output at the terminal 12 is integrated in analog form; digital integration by means of a reversible counter 71 may also be employed in which the digital values represented by the codes A, B, C and D are integrated in digital form. The reversible counter 71 will not be detailed further as construction thereof is known.

It will be appreciated that by the embodiment of FIG. 2, a practically sufficient elimination of the direct current component is achieved by inverting the polarity of the pulse levels corresponding to only a part of the quaternary code. By introducing such inversion the quarternary codes can be transmitted as a combination of five amplitude levels, with the result that the construction of the repeaters to be disposed along the transmission line may be simplified.

At the receiving end, the transmitted multilevel signal W or Y is easily reconverted into the original quaternary codes. One method for reproducing the original quaternary codes may be the rectifying method in which only the polarity-inverted pulses are rectified and added to the non-inverted pulse train. Alternatively, the multilevel signal as shown in Tables 1 and 2 may be converted into the quaternary codes A, B, C and D by means of a combination of logical circuits, and then the quaternary codes may be converted into binary codes. Accordingly, any further illustration is unnecessary and is therefore not included herein.

It will now be fully appreciated that this invention provides multilevel signal transmission with elemination of the direct current component by means of a simple circuit structure.

While the foregoing description sets forth the principles of the invention in connection with specific apparatus, it is to be understood that the description is made only by way of example and not as a limitation of the scope of the invention as set forth in the objects thereof and in the accompanying claims.

What is claimed is:

1. An improved multilevel signal transmission systems for transmitting a code signal representative of an information binary signal to be transmitted in the form of a multilevel pulse train, comprising means for converting the input binary signal to a multilevel code output pulse train of more than three levels, and means coupled to said converting means for changing to a negative polarity the polarity of at least one of the pulses of the multilevel pulse train when the time integration of said pulses has a positive value, and means for changing to a positive polarity the polarity of said one of said pulses when the time integration of said pulses has a negative value.

2. An improved signal transmission system comprising
- a code converter for receiving a binary code input signal and converting the same to a quaternary code output,
- said code output being in the form of signals representative of discrete code elements at a plurality of respective output terminals of said code converter,
- said output terminals being coupled to a respective pair of pulse generators of opposite polarity to feed the quaternary code element signals thereto,
- a signal synthesizer coupled to receive the output from said pulse generators,
- a switching pulse generator having its output coupled to at least one pair of said pulse generators,
- and means coupling signals in said system to the input of said switching pulse generator to actuate the same, whereby a multilevel pulse train is provided for transmission at the output of said signal synthesizer.

3. The signal transmission system described in claim 2 wherein
- said switching pulse generator has its input coupled to the output of said signal synthesizer,
- said switching pulse generator including integrating means and means for causing one of said pulse generators to generate a pulse of negative polarity when the time integration of the output from said signal synthesizer is positive,
- and said switching pulse generator further including means for causing one of said pulse generators to generate a pulse of positive polarity when the time integration of the output from said signal synthesizer is negative.

4. The signal transmission system described in claim 2 wherein said switching pulse generator comprises an integrating circuit and a polarity discriminator having its input coupled thereto, said input to said switching pulse generator comprises a connection between said output of said signal synthesizer and said integrating circuit, and the output from said switching pulse generator comprises signals from said polarity discriminator coupled to each of said pairs of pulse generators.

5. The signal transmission system described in claim 2 wherein said switching pulse generator comprises an inverter including a reversible counter and a polarity discriminator coupled thereto, said input to said inverter comprises means coupling the output from said code converter to said reversible counter, and the output from said inverter comprises signals from said polarity discriminator coupled to one of said pairs of pulse generators.

References Cited

UNITED STATES PATENTS

| | | | |
|---|---|---|---|
| 3,017,460 | 1/1962 | Alexander -------- | 340—349X |
| 3,233,236 | 2/1966 | Katzenstein et al. -- | 340—348X |
| 3,320,534 | 5/1967 | Altonji ----------- | 340—355X |
| 3,404,231 | 10/1968 | Aaron et al. ------ | 325—141X |

ROBERT L. GRIFFIN, Primary Examiner

R. S. BELL, Assistant Examiner

U.S. Cl. X.R.

340—332, 355